Dec. 29, 1931.  G. ROBINSON  1,838,499
TONGUE STRUCTURE FOR AUTO TRAILERS
Filed Oct. 22, 1930  2 Sheets-Sheet 1
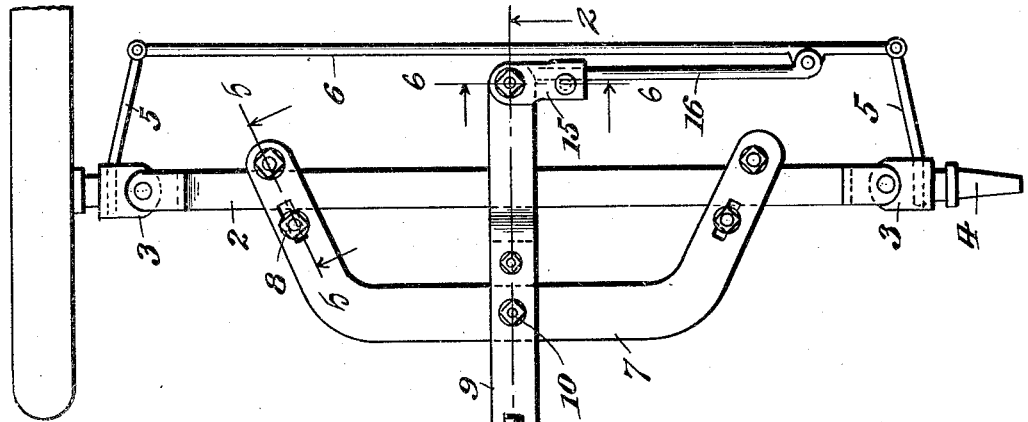
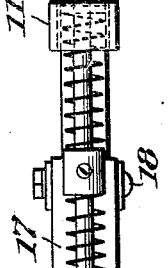
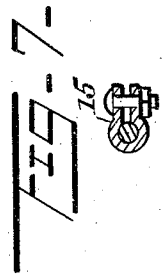
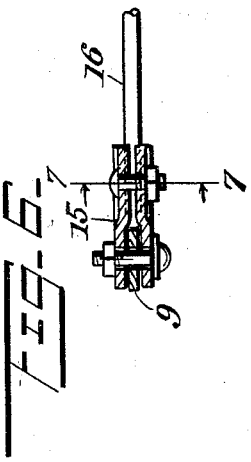
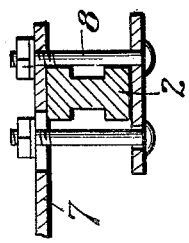
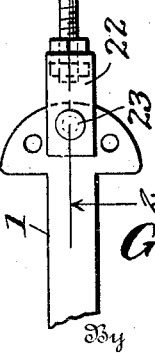
Inventor
Guy Robinson
By Jacobi & Jacobi
Attorneys

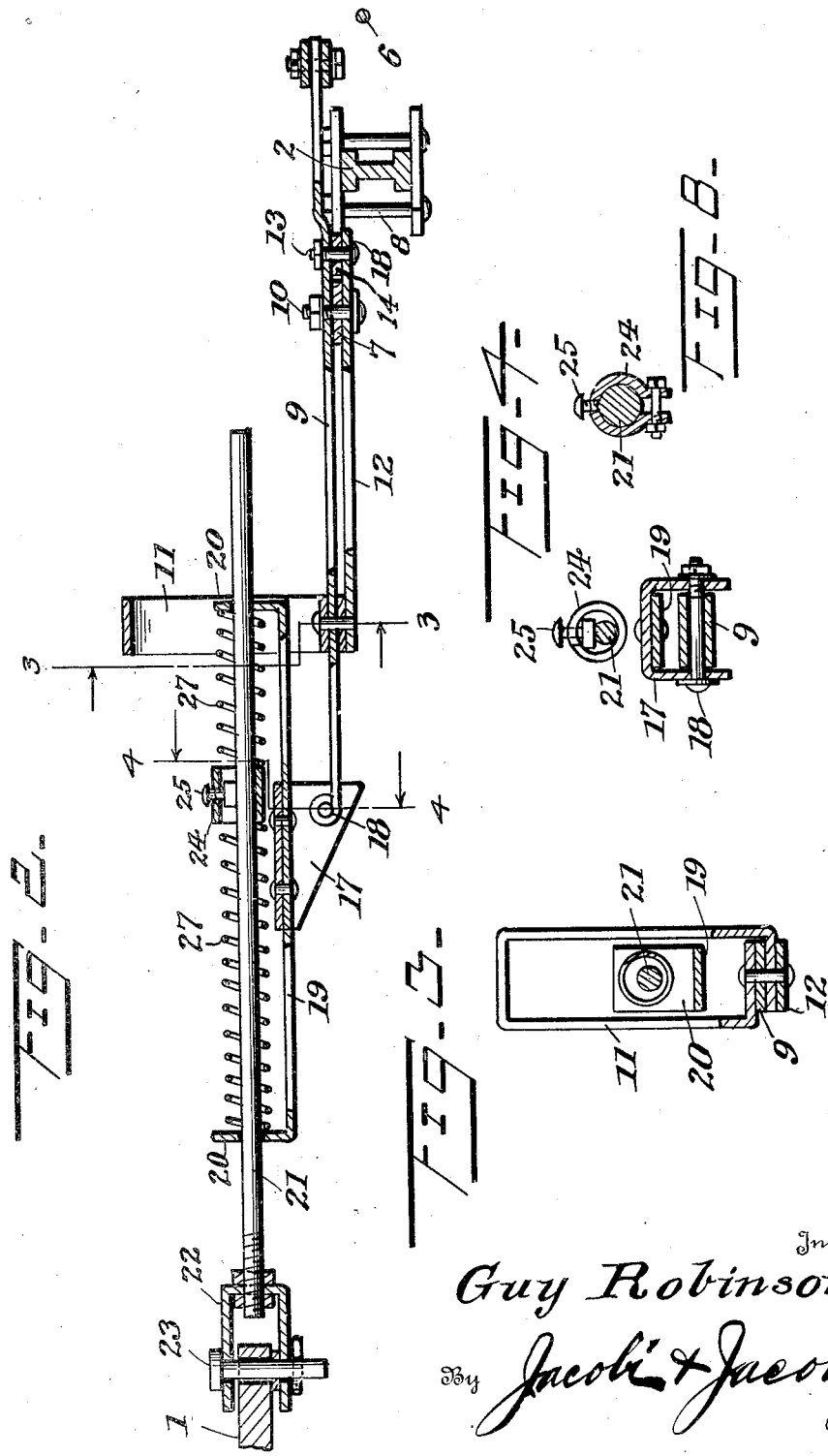

Patented Dec. 29, 1931

1,838,499

UNITED STATES PATENT OFFICE

GUY ROBINSON, OF SAN ANGELO, TEXAS

TONGUE STRUCTURE FOR AUTO TRAILERS

Application filed October 22, 1930. Serial No. 490,530.

This invention relates to a tongue structure especially adapted to be used for connecting a trailer with a tractor and it consists in the novel features hereinafter described and claimed.

The invention relates to a draft means between the tractor and the trailer and has for its object to provide an improved steering connection that will be operative effectively and accurately in the operation of the vehicle, and a further object of the invention is to improve the construction of the draft and steering means so that there may be a variation between the height of the vehicles without the tendency of producing a reactive steering effect.

A further object of the invention is to provide a structure of the character stated which is devoid of torque on the steering members of the trailer and with these objects in view, the invention consists of the construction, combination in details and arrangement of the parts as hereinafter described and claimed.

In the accompanying drawings:

Figure 1 is a plan view of the tongue structure for auto trailers.

Figure 2 is a longitudinal sectional view thereof.

Figure 3 is a transverse sectional view thereof, cut on the line 3—3 of Figure 2.

Figure 4 is a similar view cut on the lines 4—4 of Figure 2.

Figure 5 is a detail sectional view cut on the line 5—5 of Figure 1.

Figure 6 is a detail sectional view cut on the line 6—6 of Figure 1.

Figure 7 is a detail sectional view, cut on the line 7—7 of Figure 6.

Figure 8 is a detail sectional view of a modified form of part which may be used in the device.

As illustrated in the accompanying drawings, the tractor draw-bar is shown at 1. The trailer is provided with a short axle 2 having knuckles 3 pivoted at its ends, and the said knuckles are provided with spindles 4 and arms 5. The arms 5 are pivotally connected together by a drag link 6 in a usual manner.

The tongue structure includes a substantially U-shaped plate 7 secured at its ends to the axle 2 by means of bolts 8.

A bar 9 is pivotally connected by means of a bolt 10 with the plate 7 at a point midway between the ends thereof. A guide-loop 11 is mounted at the forward end of the bar 9. A bracing strip 12 is located under the bar 9 and is connected at its forward end with the lower side of the loop 11 and the bolt 10 passes through the strip 12. The strip 12 is carried behind the plate 7 and a safety bolt 13 passes through the strip and the bar, a block 14 being interposed between the strip and the bar and lying behind the rear edge of the plate 7.

In the event that the bolt 10 should break, the safety bolt 13 holds the block 14 against the rear edge of the plate 7 so that the bar 9 cannot become detached from the plate 7.

A sleeve 15 is pivoted at the rear end of the bar 9 and a rod 16 is secured at one end in the sleeve 15 and has its other end pivoted to the drag link 6 at a point in front of the same and in the vicinity of one end thereof. Thus, when the bar 9 is swung, the rod 16 moves longitudinally and moves the rod 6 so that the knuckles 3 are turned and inasmuch as the rod 16 is connected with the drag link 6 in front of the same and at a point in the vicinity of one end of the drag link 6, the movement of the rod 16 will not interfere with the movement of the drag link 6.

A bracket 17 is connected with the forward end of the bar 9 by means of a pivot bolt 18 whereby the said bracket 17 may have vertical swinging movement with relation to the bar 9. A U-shaped guide member 19 is fixed at a point between its ends to the bracket 17 and the said guide member is provided with upstanding end portions 20. It may be here stated that by use of the guide loop 11, vertical movement of the guide member 19 carrying the bracket 17 thereon is limited to a degree. If the vertical movement of the guide member was allowed full play, it might prove disastrous if it became necessary to stop the tractor suddenly on a down grade with a heavy load on the trailer by snapping either the clevis 22 or the pin 23. Further, the connection of the loop 11, strip 12 and bar 9 is advantageous, as one end of the loop 11 passing between the strip 12 and bar 9 acts as a block, thereby permitting the strip 12 and bar 9 to be bolted together in flat parallel relation without the necessity of bending or otherwise adapting the two members 9 and 12 for connection. A rod 21 is slidably mounted in the upstanding end portions 20 and carries at its forward end a clevis 22 which is connected with the draw-bar 1 by means of a coupling pin 23. An abutment member 24 is mounted upon the intermediate portion of the rod 21 and is secured thereto by means of a set screw 25.

Coil springs 26 and 27 surround the rod 21 and bear at their inner ends against the ends of the abutment member at the opposite sides thereof and the outer ends of said springs bear against the end portions 20 of the guide member 19.

From the foregoing description, it is apparent that when a pulling strain is exerted upon the rod 21 through the clevis 22 and coupling pin 23 from the draw-bar 1, the spring 26 is compressed and a pulling strain is transmitted through the spring 26 and the guide member 19 to the bracket 17 and the bar 9. Inasmuch as the bar 9 is connected with the axis of the trailer, the trailer is moved in a forward direction. When a pushing strain is exerted upon the bar 21, the said force is transmitted through the parts 19, 17 and bar 9 so that the trailer is backed. When the tractor makes a turn, the rod 21 and the parts connected therewith swings the bar 9 whereby the rod 16 is moved longitudinally and the drag link 6 is moved longitudinally so that the knuckles 3 are turned through the arms 15 and the wheels of the trailer are steered or directed so that the trailer will move in the same general direction as that in which the tractor turns.

Various changes may be made without departing from the spirit of the invention as claimed.

Having thus described the invention, what is claimed is:

1. A tongue structure for connecting a tractor with a trailer comprising a plate adapted to be connected with the axle of the trailer, a bar pivotally connected at a point between its ends to a plate at a point midway between the ends thereof, a safety pin carried by the bar and located behind the plate, a rod pivotally connected at one end with the bar and adapted to be pivotally connected with the drag link of the tractor, a guide loop mounted upon the bar, a bracket pivotally connected at the forward end of the bar, a guide member carried by the bracket and having one end received in the loop, a rod slidably mounted in the guide member, means for connecting the rod with a tractor, an abutment member mounted upon the rod and springs bearing at their inner ends against the abutment member and at their outer ends against the guide member.

2. A tongue structure for auto trailers comprising a plate adapted to be connected with the axle of the trailer, a bar pivoted upon the plate, a rod pivotally connected with the bar and adapted to be connected with the drag link of the trailer, a bracket pivoted upon the bar, a guide member fixed to the bracket, a rod slidably mounted upon the guide member, means for connecting the rod with the tractor, an abutment member mounted upon the rod between the ends of the guide member, springs bearing at their inner ends against the abutment member and at their outer ends against the ends of the guide member, and a guide loop adapted to receive one end of the guide member, said guide loop limiting the vertical movement of the forward end of the tongue structure to prevent fracture thereof.

In testimony whereof I affix my signature.

GUY ROBINSON.